(12) United States Patent
Ray et al.

(10) Patent No.: US 11,725,168 B2
(45) Date of Patent: *Aug. 15, 2023

(54) APPARATUS, SYSTEM AND METHOD FOR FILLING A BEVERAGE CONTAINER

(71) Applicant: CRAFT STANDARD ENTERPRISES, INC., Fayetteville, AR (US)

(72) Inventors: William Ray, Fayetteville, AR (US); Don Ray, Fayetteville, AR (US); Benjamin Simon, Dallas, TX (US)

(73) Assignee: CRAFT STANDARD ENTERPRISES, INC., Fayetteville, AR (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/301,458

(22) Filed: Apr. 2, 2021

(65) Prior Publication Data

US 2022/0002138 A1 Jan. 6, 2022

Related U.S. Application Data

(60) Provisional application No. 63/047,237, filed on Jul. 1, 2020.

(51) Int. Cl.
*C12G 3/04* (2019.01)
*B67D 1/12* (2006.01)
(Continued)

(52) U.S. Cl.
CPC .............. *C12G 3/04* (2013.01); *B67C 3/34* (2013.01); *B67C 11/02* (2013.01); *B67D 1/0831* (2013.01);
(Continued)

(58) Field of Classification Search
CPC .. C12G 3/04; B67C 3/34; B67C 11/02; B67C 2011/30; B67D 1/0831; B67D 1/0848; B67D 1/1277; B67D 1/1405
See application file for complete search history.

(56) References Cited

U.S. PATENT DOCUMENTS

| | | | | |
|---|---|---|---|---|
| 194,508 A | * | 8/1877 | Aenis | B67D 1/0832 137/212 |
| 2,539,349 A | * | 1/1951 | Giles | B67D 1/0832 222/400.7 |

(Continued)

FOREIGN PATENT DOCUMENTS

| | | |
|---|---|---|
| GB | 606173 A | 8/1948 |
| GB | 998004 A | 7/1965 |

(Continued)

OTHER PUBLICATIONS

PCT International Preliminary Report on Patentability for International Application No. PCT/US21/70354, dated Jan. 12, 2023, 10 pages.

(Continued)

*Primary Examiner* — Nicolas A Arnett
(74) *Attorney, Agent, or Firm* — Hoffman Warnick LLC

(57) ABSTRACT

A filling apparatus includes an upper hollow body having a top opening and a bottom opening; a first annular cylinder coupled to the upper hollow body via the bottom opening; a locking ring having a first keg lock slot and a second keg lock slot and coupled to the first annular cylinder; a second annular cylinder coupled to the first annular cylinder; a body seal ring coupled to the second circular cylinder; a bottom hollow cylinder coupled to the second annular cylinder and including a first vent opening probe, a second vent opening probe, and a probe divide wall. The filling apparatus can be (Continued)

connected to a valve on a keg, such as a Sankay-D valve, and can be used to pour alcohol and other liquids into the keg.

14 Claims, 10 Drawing Sheets

(51) Int. Cl.
*B67D 1/08* (2006.01)
*B67D 1/14* (2006.01)
*B67C 3/34* (2006.01)
*B67C 11/02* (2006.01)
*B67C 11/00* (2006.01)

(52) U.S. Cl.
CPC ......... *B67D 1/0848* (2013.01); *B67D 1/1277* (2013.01); *B67D 1/1405* (2013.01); *B67C 2011/30* (2013.01)

(56) References Cited

U.S. PATENT DOCUMENTS

| | | | | |
|---|---|---|---|---|
| 3,231,154 | A * | 1/1966 | Johnston | B67D 1/0832 222/400.7 |
| 3,357,602 | A * | 12/1967 | Sichler | B67D 1/0832 137/853 |
| 3,439,844 | A * | 4/1969 | Johnston | B67D 1/0832 222/400.7 |
| 3,712,514 | A * | 1/1973 | LeBlanc | F25D 31/006 222/626 |
| 4,494,585 | A * | 1/1985 | Waldecker | B67C 11/00 141/297 |
| 4,717,048 | A * | 1/1988 | Stenger | B67D 1/0832 137/320 |
| 4,728,010 | A * | 3/1988 | Johnston | B67D 1/0832 137/212 |
| 9,828,227 | B2 * | 11/2017 | Dalton | G05D 16/08 |
| 11,511,986 | B2 * | 11/2022 | Ray | B67D 7/0294 |
| 11,518,668 | B2 * | 12/2022 | Caputo | B67D 1/0841 |
| 2005/0279777 | A1 * | 12/2005 | Taguchi | B67C 3/34 222/399 |
| 2006/0118574 | A1 * | 6/2006 | Anderson | B67C 3/30 222/1 |
| 2007/0169834 | A1 * | 7/2007 | Monzel | B67C 3/34 141/18 |
| 2015/0291407 | A1 * | 10/2015 | Fox | B67C 11/02 141/339 |
| 2016/0152463 | A1 * | 6/2016 | Ware | B67D 7/0261 222/1 |
| 2017/0088408 | A1 * | 3/2017 | Fickert | B67C 3/34 |
| 2022/0002132 | A1 * | 1/2022 | Ray | B67D 1/0805 |
| 2022/0002138 | A1 * | 1/2022 | Ray | B67D 1/0831 |
| 2022/0002141 | A1 * | 1/2022 | Ray | B67C 3/34 |
| 2022/0055880 | A1 * | 2/2022 | Ray | C12G 3/04 |

FOREIGN PATENT DOCUMENTS

| | | |
|---|---|---|
| GB | 1115223 A | 5/1968 |
| WO | 2019110218 A1 | 6/2019 |

OTHER PUBLICATIONS

PCT International Search Report and Written Opinion for International Application No. PCT/US21/59870, dated Mar. 24, 2022, 16 pages.
PCT Notification of Transmittal of the International Search Report and the Written Opinion of the International Searching Authority, or the Declaration, issued from the International Searching Authority, dated Dec. 6, 2021, 22 pages.
Westby, G., Negroni in Barrel, YouTube.com, Jun. 4, 2013, https://www.youtube.com/watch?v=I6PDYtZ7YoU, 1 page.
Man Skirt Brewing, Filling kegs with Hard Seltzer at Man Skirt Brewing, YouTube.com, May 10, 2020, https://www.youtube.com/watch?v=ROfH5nUvUzk, 1 page.
Notification of Transmittal of the International Search Report and the Written Opinion of the International Searching Authority, or the Declaration issued to International Application No. PCT/US21/70354 dated Sep. 14, 2021, 13 pages.
PCT International Search Report and Written Opinion for International Application No. PCT/US21/48251, dated Dec. 10, 2021, 13 pages.
'Instructional Video %E2%80%93 For Margarita, Mule, Paloma, and Mojito _ v2' (Benjamin Simon) Jan. 27, 2021 (Jan. 27, 2021) [online] retrieved from <U RL: https ://vimeo.co m/505378455> entire document.
'D System Keg Valve' (Micro Matic) May 7, 2019 (May 7, 2019) [online] ret rieved from <URL:https://www.ca lifo miac ra flbee r.co m/wp-conten Vuploa ds/201 9/05/D-Sys te rn-Keg-Valves-Sa fe ty-a nd-Qua lity-Assura nce-for-your-D raft-Bee r.pdf> en tire document, espe cia lly p. 6, 13, 15.
'Performance Guide li ne.s For Refillable Kegs' (Brewers Association) Mar. 19, 2014 (Mar. 19, 2014)[online ] retrieved from <UR L:https ://www.brewe rsass ocla1lon .org/a ttachme nts/0 001/4565/ Perfo rmance_Gu_ fde li nes_for _Re filla ble_ Kegs . pdf> entire document, especially p. 9.
Invitation to Pay Additional Fees And, Where Applicable, Protest Fee (Form PCT/ISA/206) issued from the International Searching Authority to International Application No. PCT/US21/70354 dated Jun. 2, 2021, 14 pages.

* cited by examiner

APPARATUS, SYSTEM AND METHOD FOR FILLING A BEVERAGE CONTAINER

CROSS-REFERENCE TO RELATED APPLICATIONS

This application claims priority to U.S. Application No. 63/047,237, filed Jul. 1, 2020, entitled "Keg Spiker," the contents of which are incorporated herein by reference.

FIELD OF THE INVENTION

The present invention relates generally to an apparatus, system and process for filling a beverage container, and more particularly to system and method for filling a keg with liquid using an apparatus that connects to a conventional keg valve.

BACKGROUND

Bars, restaurants and other establishments that serve alcoholic beverages commonly have serving equipment that includes refrigerators, couplers, regulators, lines and taps for beer kegs. Often, a bar will offer a large selection of beers, each with its own line and customized tap. One of the most common configurations includes a Sankey-D coupler, which is a widely used coupling device in bars and restaurants for beer kegs.

Although this equipment has provided high efficiencies in serving beer, the same is not true for mixed drinks. Alcoholic beverage laws prohibit the sale of spirits in containers larger than 1.75 liters; hence there are no kegs or taps for mixed drinks. At the same time, the preparation of mixed drinks requires skill and experience to know the various constituents of the mixed drink, the relative quantities, and to consistently mix the drink in the right proportions, often in a crowded, busy environment. These factors result in significant losses, inefficiencies and decreased quality arising from inconsistent and inaccurate mixing by bartenders of different skill levels as well as the time it takes even a skilled bartender to combine all the constituents of the mixed drink.

In addition to the prohibition on selling spirits in containers larger than 1.75 liters, there is an additional challenge that has prevented the use of kegs to serve mixed drinks on tap. Kegs are generally filled with a keg filling device that uses an industrial, pressurized system to fill the keg. Conventional keg filling devices require large, high volume tanks and pressure to fill the keg through a coupling device such as a Sankey-D coupler. For example, an industrial filling equipment uses a filling Sankey with a larger internal opening to allow liquid to flow faster when filling than a normal Sankey used for dispensing. These conventional keg filling devices further typically take a large amount of space and fill the keg through a liquid dispensing tube of the coupler. Setting up such conventional keg filling devices requires large spaces and an investment in heavy equipment to install tanks. Further, the conventional keg filling devices cannot be transported without large trucks and cannot be used without large tanks and pressure. Hence, there is no easy way to fill kegs without the use of large, heavy, expensive equipment.

These and other drawbacks have greatly inhibited the efficient serving of mixed drinks at bars, restaurants and other establishments.

SUMMARY

According to one embodiment, the invention relates to an apparatus, system, and method that enables bars, restaurants, and other establishments to serve mixed drinks and craft cocktails on draft using a standard beer keg system, such as a Sankey (or Sanke) keg and related Sankey coupler, lines, and taps. The Sankey keg may include the Sankey-D valve, for example, or other Sankey valves, such as Sankey S, A, G, U, or M type systems. Exemplary embodiments may use a Sankey-D valve as an example; however, this is meant to be non-limiting.

According to one example, a keg having a Sankey-D valve is partially filled with a non-alcoholic, liquid cocktail mix. The keg may be of any type, such as a rubber barrel, beveled barrel, half barrel, slim quarter, quarter barrel, Cornelius keg, and sixth barrel. It should be appreciated that the amount of liquid (e.g., mix and alcohol) will be adjusted based on the keg size. Since the mix is non-alcoholic, there is no prohibition on the use of a keg, such as a standard, 30-liter Sankey-D type keg. In one particular embodiment, a 30-liter keg is partially filled with 21 liters of liquid cocktail mix (e.g., margarita mix). The keg is then shipped to a bar, restaurant or other establishment that serves alcoholic drinks. A keg filling apparatus, which will be described in detail below, is also provided to the bar, restaurant or other establishment. The bartender installs the keg-filling apparatus on the keg valve and pours alcohol into the keg via the keg-filling apparatus. The keg-filling apparatus allows the keg to be filled with the alcohol using only gravity, rather than a large, pressurized industrial filling system. Once the specified amounts and types of alcohol (e.g., 9 liters total of one or more spirits) have been poured into the keg and mixed with the cocktail mix, the keg filling apparatus is removed, the contents in the keg are mixed and the keg is ready to be installed in the Sankey-D tap system, just like a beer keg.

According to one embodiment, the invention relates to an apparatus for filling a container (e.g., a keg) with liquid, wherein the container includes a valve that seals the container and a locking recess to receive the filling apparatus. The valve may include multiple parts such as a ball valve and a venting valve. The filling apparatus may comprise an upper hollow body (e.g., in the shape of a funnel) having a top opening and a bottom opening, the top opening enabling a liquid to be poured into the top opening. The filling apparatus may also comprise a lower hollow body joined to a lower end of the upper hollow body. The lower hollow body may include a locking ring that locks into the locking recess of the container, a probe that engages with a portion of the valve of the container to open that portion of the valve, wherein the probe includes a cylindrical side wall and a dividing wall that separates a first opening within the probe for releasing gas, from a second opening within the probe for receiving the liquid. The probe preferably has a length that opens the portion of the valve by a displacement amount that is large enough to allow the gas to escape from the container through the first opening without allowing the liquid to escape from the container.

According to another embodiment, the invention relates to a method for distributing mixed drinks. The method may comprise providing a keg containing a non-alcoholic mix of liquids, wherein the mix is designed to be converted to a mixed drink by addition of alcohol, the quantity of mix in the keg is predetermined to allow for the addition of a predetermined quantity of the alcohol into the keg to complete the mixed drink; and the keg includes a valve such as a Sankey-D valve that is designed to connect to a coupler used to dispense beverages from the keg.

According to another embodiment, the invention relates to a method for preparing mixed drinks. The method may comprise receiving a keg containing a non-alcoholic mix of liquids, wherein (a) the mix is designed to be converted to a mixed drink by addition of alcohol; (b) the quantity of the mix in the keg is predetermined to allow for the addition of a predetermined quantity of the alcohol into the keg to complete the mixed drink; and (c) the keg comprises a valve, e.g., a Sankey-D valve, designed to be connected to a coupler through which the mixed drink is dispensed. The method may also comprise using an apparatus to pour the alcohol into the keg, wherein the apparatus includes an upper hollow body connected to a lower hollow body, and the lower hollow body includes a locking ring to lock the apparatus onto the keg and a probe to displace a portion of the valve in the keg, allowing gas to escape from the keg and allowing the alcohol to be poured into the keg through the upper hollow body and the lower hollow body. The method may also comprise mixing the mix with the alcohol to complete the mixed drink in the keg; connecting the keg to a coupler; and dispensing the mixed drink through a tap connected to the coupler.

Exemplary embodiments of the invention can provide a solution that significantly reduces the time needed to make the most popular craft cocktails and mixed drinks, which, in turn, increases the number of craft cocktails and mixed drinks sold by the bar, restaurant, or other establishment. For alcoholic beverage distributors, increased throughput at bars, restaurants and other establishments results in an increase in the quantity of spirits sold. Furthermore, embodiments of the invention allow bars and restaurants that own standardized beer keg systems, such as the widely-used Sankey-D keg system, to use their existing equipment to serve craft cocktails and mixed-drinks on draft. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Various embodiments of the invention relate to a filling apparatus for a container such as a keg and related processes and systems for using the filling apparatus to add a liquid such as alcohol to the container. The apparatus may be configured to be a hand-held device designed to release air pressure in the keg and also enable filling the keg with additional liquid by gravity. Various embodiments of the invention can overcome the disadvantages described above.

Figure 1:
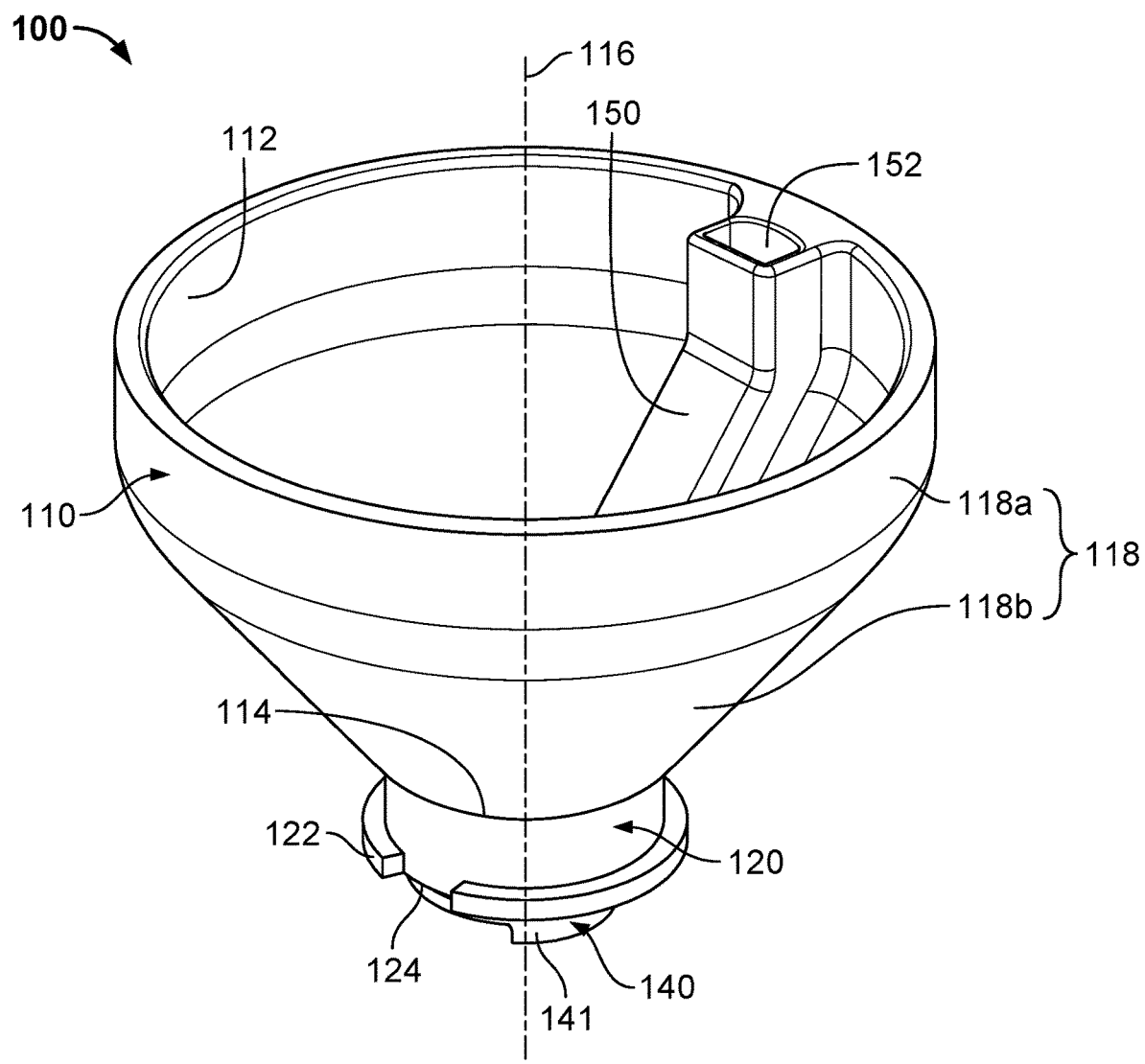
FIG. 1 illustrates a top perspective view of an example filling apparatus (also sometimes referred to as the "keg spiker"), according to one embodiment of the invention.

The figures are now referred to for a detailed description of exemplary embodiments of the invention. FIG. 1 illustrates a top perspective view 100 of one example of a filling apparatus. As shown in FIG. 1, the filling apparatus may be in the general shape of a funnel or other suitable configuration. The filling apparatus may be used for pouring a liquid into a keg by virtue of the weight of the liquid. As shown in FIG. 1, the filling apparatus may include an upper hollow body 110, a first annular cylinder 120, a second annular cylinder 130 (refer to FIG. 2), and a bottom hollow cylinder 140.

The upper hollow body 110 may include a top opening or aperture 112 (also referred to as funnel entrance) and a distal bottom opening 114 that may be smaller or narrower than the top opening 112. The upper hollow body 110 may vertically taper down from the top opening 112 to the distal bottom opening 114 along a central axis or funnel axis 116 of the example filling apparatus (which also may be referred to as the "keg spiker").

The upper hollow body 110 may include a wall 118 having a desired thickness. The wall 118 may include a vertically straight wall 118a and a vertically gradual tapering wall 118b. The vertically straight wall 118a and the vertically gradual tapering wall 118b may be integral (e.g., by a molding process) or may be separate and then joined together by, for example, welding. The vertically straight wall 118a and the vertically gradual tapering wall 118b may have a substantially the same wall thickness or different wall thicknesses.

The top opening 112 of the upper hollow body 110 may be a circular opening or a substantially circular opening. In some embodiments, the top opening 112 of the upper hollow body 110 may be a polygonal opening. Other substantially circular shaped openings may be implemented. According to an exemplary illustration, the vertically straight wall 118a may comprise a plurality of sub-walls such that the vertically straight wall 118a is formed having a polygonal horizontal cross section perpendicular to the central axis 116, which renders the top opening 112 to be a corresponding polygonal opening. The distal bottom opening 114 may be a circular or substantially circular opening. In the embodiments in which the top opening 112 of the upper hollow body 110 is a circular opening or a substantially circular opening, the upper hollow body 110 tapers down vertically along the central axis 116 from the large diameter circular opening 112 to the smaller diameter distal opening 114.

The upper hollow body 110 may be made of metal, plastic, polymer, wood or any other semi-rigid or rigid material which is machinable, moldable, castable or formable with physical properties such that it is rigid and able to maintain its shape and be of sufficient strength and stiffness so as to allow it to functionally perform in the manner described herein.

The first annular cylinder 120 may be fixed or joined to the upper hollow body 110 via the distal bottom opening 114 of the upper hollow body 110 by means of welding, gluing, soldering, machining, carving, 3D printing, and so forth. As used herein the term "coupled" is not meant to be limiting and intended to be broadly defined to encompass removable attachments, permanent attachments, fixed attachments, integrated, integral, etc. The first annular cylinder 120 may be substantially aligned with the upper hollow body 110 with respect to the central axis 116. In some embodiments, the first annular cylinder 120 and the upper hollow body 110 may be an integral component, which can be formed by molding, 3D printing, casting, machining, and so on. The first annular cylinder 120 may be adapted to have any suitable length along the central axis 116. The first annular cylinder 120 may have a wall thickness greater than, equal to, or less than the thickness of the vertically straight wall 118a and the thickness of the vertically gradual tapering wall 118b. The internal diameter of the first annular cylinder 120 may be greater than, equal to, or less than the bottom opening 114 of the upper hollow body 110.

Figure 2:
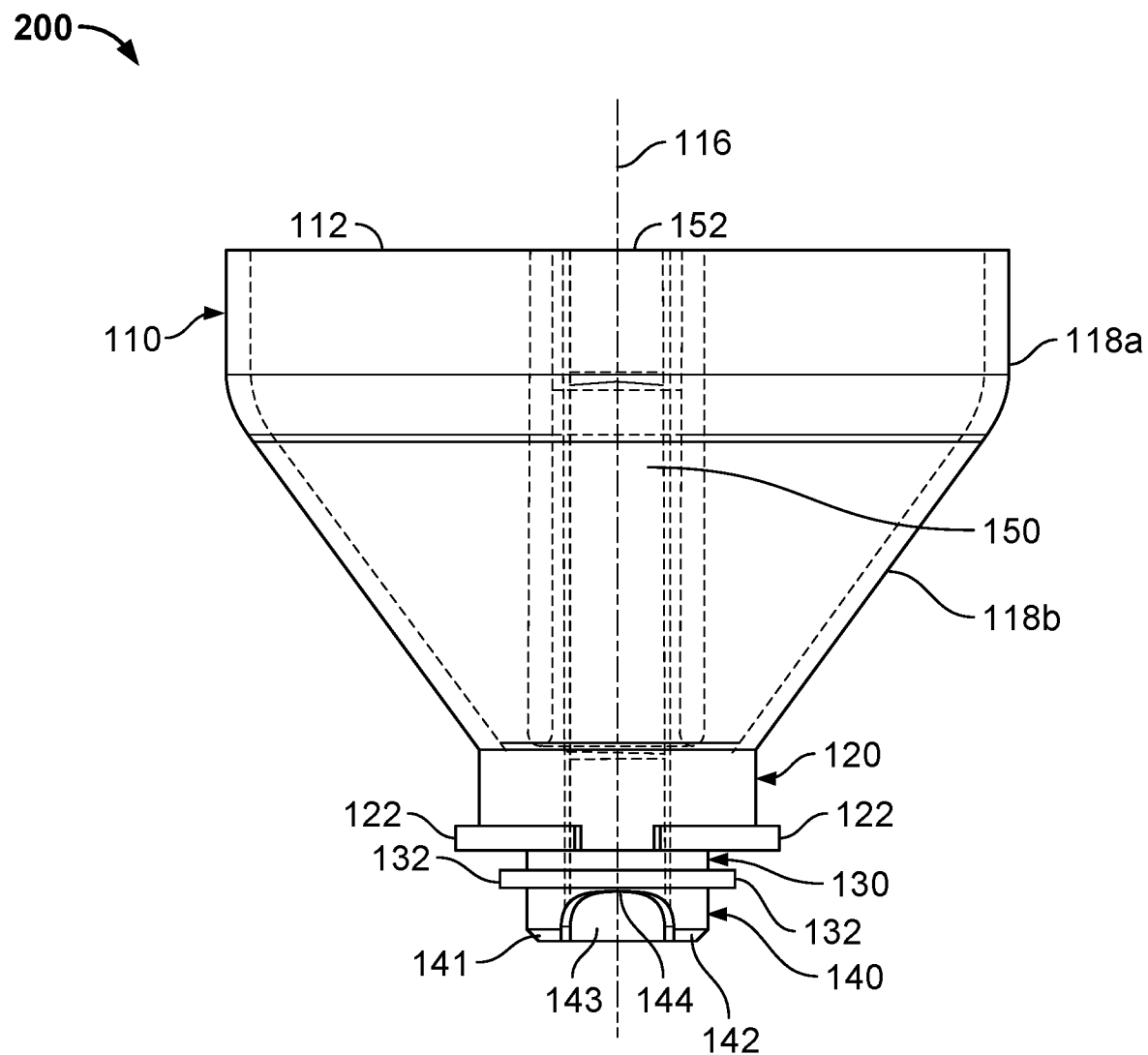
FIG. 2 illustrates a side view of an example filling apparatus, according to an embodiment of the invention.

A locking ring 122 may be circumferentially coupled to an outer circular surface of the first annular cylinder 120 and disposed substantially adjacent to a bottom end of the first annular cylinder 120 (also referring to FIG. 2). The locking ring 122 may be configured to include a first keg lock slot 124 and a second keg lock slot 126 opposite to the first keg lock slot 124 with respect to the central axis 160 (also referring to FIG. 3). The portion of the locking ring 122 other than the first keg lock slot 124 and the second keg lock slot 126 may be referred to as a locking member of the locking ring 122. In some embodiments, the first keg lock slot 124 and the second keg lock slot 126 may be formed by circumferentially coupling the locking member to the outer circular surface of the first annular cylinder 120. In other embodiments, the first keg lock slot 124 and the second keg lock slot 126 may be formed by first circumferentially coupling a whole ring of the locking ring 122 to the outer circular surface of the first annular cylinder 120 and then carving out or machining off corresponding portions of the whole ring, such that only the locking member of the locking ring 122 is retained on the outer circular surface of the first annular cylinder 120.

The locking ring 122 may be coupled to the outer circular surface of the first annular cylinder 120 by means of welding, gluing, soldering, machining, carving, 3D printing, and so forth. Alternatively, the locking ring 122 and the first annular cylinder 120 may be an integral component, which can be formed by molding, 3D printing, casting, machining, and so on. The locking ring 122 may be adapted to have a suitable outer diameter and a suitable vertical height along the central axis 116.

As shown in FIG. 2, the second annular cylinder 130 may be configured to have a smaller outer diameter than or a substantially similar outer diameter as the first annular cylinder 120. The second annular cylinder 130 may be coupled to the first annular cylinder 120 via the bottom end of the first annular cylinder 120 and substantially aligned with the first annular cylinder 120 along the central axis 116. The second annular cylinder 130 may be coupled to the first annular cylinder 120 by means of welding, gluing, soldering, machining, carving, 3D printing, and so forth. Alternatively, the second annular cylinder 130 and the first annular cylinder 120 may be an integral component, which can be formed by molding, 3D printing, casting, machining, and so on. The second annular cylinder 130 may be adapted to have any suitable length along the central axis 116. The internal diameter of the second annular cylinder 130 may be greater than, equal to, or less than the internal diameter of the first annular cylinder 120.

As shown in FIG. 2, a body seal ring 132 may be circumferentially coupled to an outer circular surface of the second annular cylinder 130 and disposed substantially adjacent a bottom end of the second annular cylinder 130. The body seal ring 132 may have an outer diameter less than or equal to the outer diameter of the locking ring 122. The body seal ring 132 may be coupled to the outer circular surface of the second annular cylinder 130 by means of welding, gluing, soldering, machining, carving, 3D printing, and so forth. Alternatively, the body seal ring 132 and the second annular cylinder 130 may be an integral component, which can be formed by molding, 3D printing, casting, machining, and so on. The body seal ring 132 may be adapted to have a suitable outer diameter and a suitable vertical height along the central axis 116.

Also shown in FIG. 2, the bottom hollow cylinder 140 is configured to have a substantially similar outer diameter as the second annular cylinder 130 and is coupled to the second annular cylinder 130 via the bottom end of the second annular cylinder 130. The bottom hollow cylinder 140 may be substantially aligned with the second annular cylinder 130 along the central axis 116. The bottom hollow cylinder 140 may be coupled to the second annular cylinder 130 by means of welding, gluing, soldering, machining, carving, 3D printing, and so forth. Alternatively, the bottom hollow cylinder 140 and the second annular cylinder 130 may be an integral or integrated component, which can be formed by molding, 3D printing, casting, machining, and so on. The bottom hollow cylinder 140 may be adapted to have any suitable length along the central axis 116. The internal diameter of the bottom hollow cylinder 140 may be greater than, equal to, or less than the internal diameter of the second annular cylinder 130.

Figure 3:
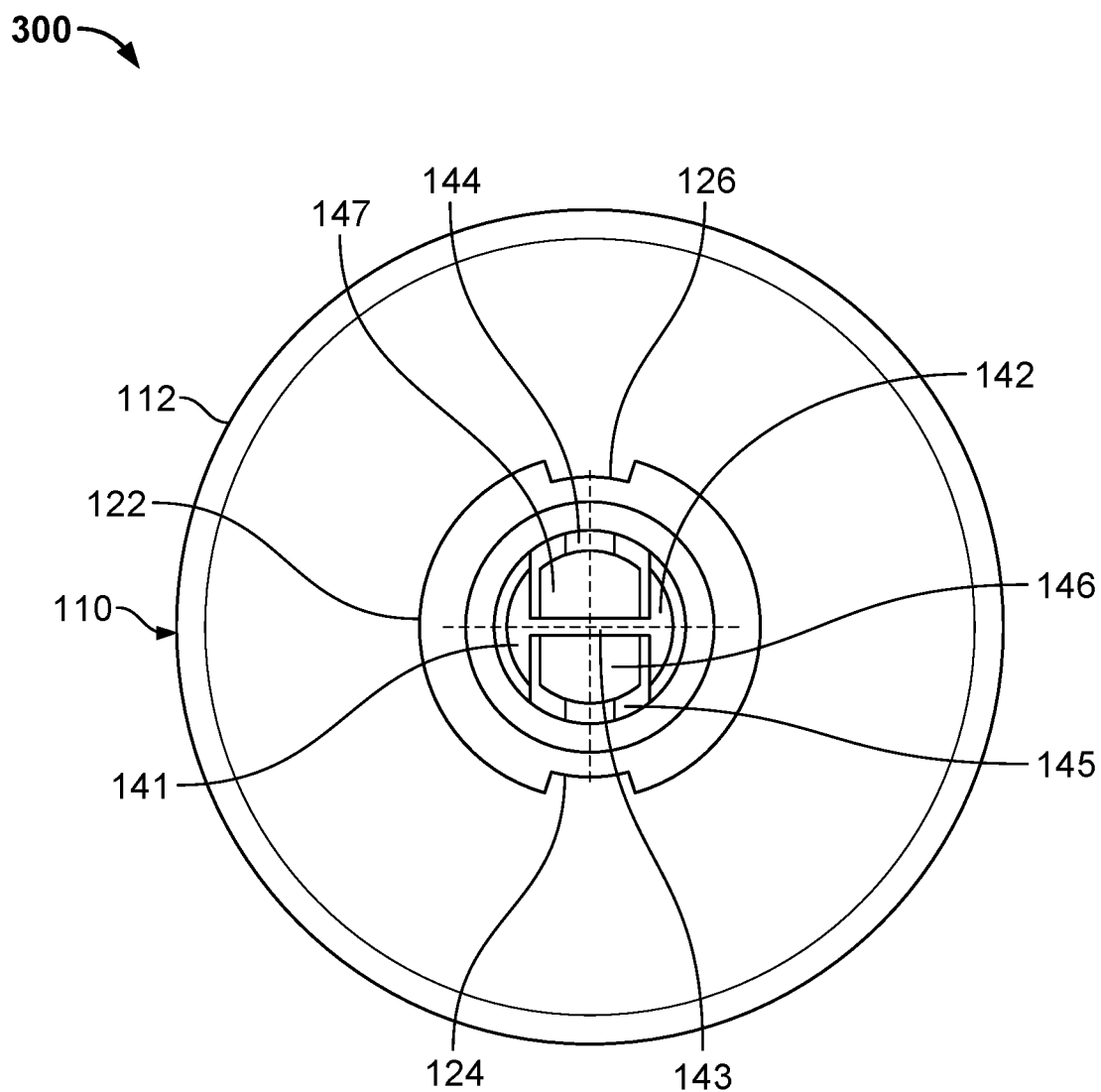
FIG. 3 illustrates a bottom view of an example filling apparatus, according to an embodiment of the invention.

As shown in FIGS. 1-3, the bottom hollow cylinder 140 may include a first vent opening probe 141, a second vent opening probe 142 opposite to the first vent opening probe 141, and a probe divide wall 143 connecting and extending between the first vent opening probe 141 with the second vent opening probe 142. The bottom hollow cylinder 140 may further include a first anti-leak side wall 144 and a second anti-leak side wall 145 opposite the first anti-leak side wall 144. The first anti-leak side wall 144 and the second anti-leak side wall 145 laterally connect with the first vent opening probe 141 and the second vent opening probe 142 correspondingly to form the vertical side wall of the bottom hollow cylinder 140. The first anti-leak side wall 144 and the second anti-leak side wall 145 are typically shorter than the first vent opening probe 141 and the second vent opening probe 142 along the central axis 116, and may be formed by carving out or machining off corresponding portions of the vertical side wall of the bottom hollow cylinder 140. Further, the probe divide wall 143 may be configured to divide an internal hollow space of the bottom hollow cylinder 140 into two hollow spaces: a first opening or aperture 146 and a second opening or aperture 147 opposite the first opening 146. The first opening 146 and the second opening 147 may be substantially similar in size according to one embodiment.

Figure 4:
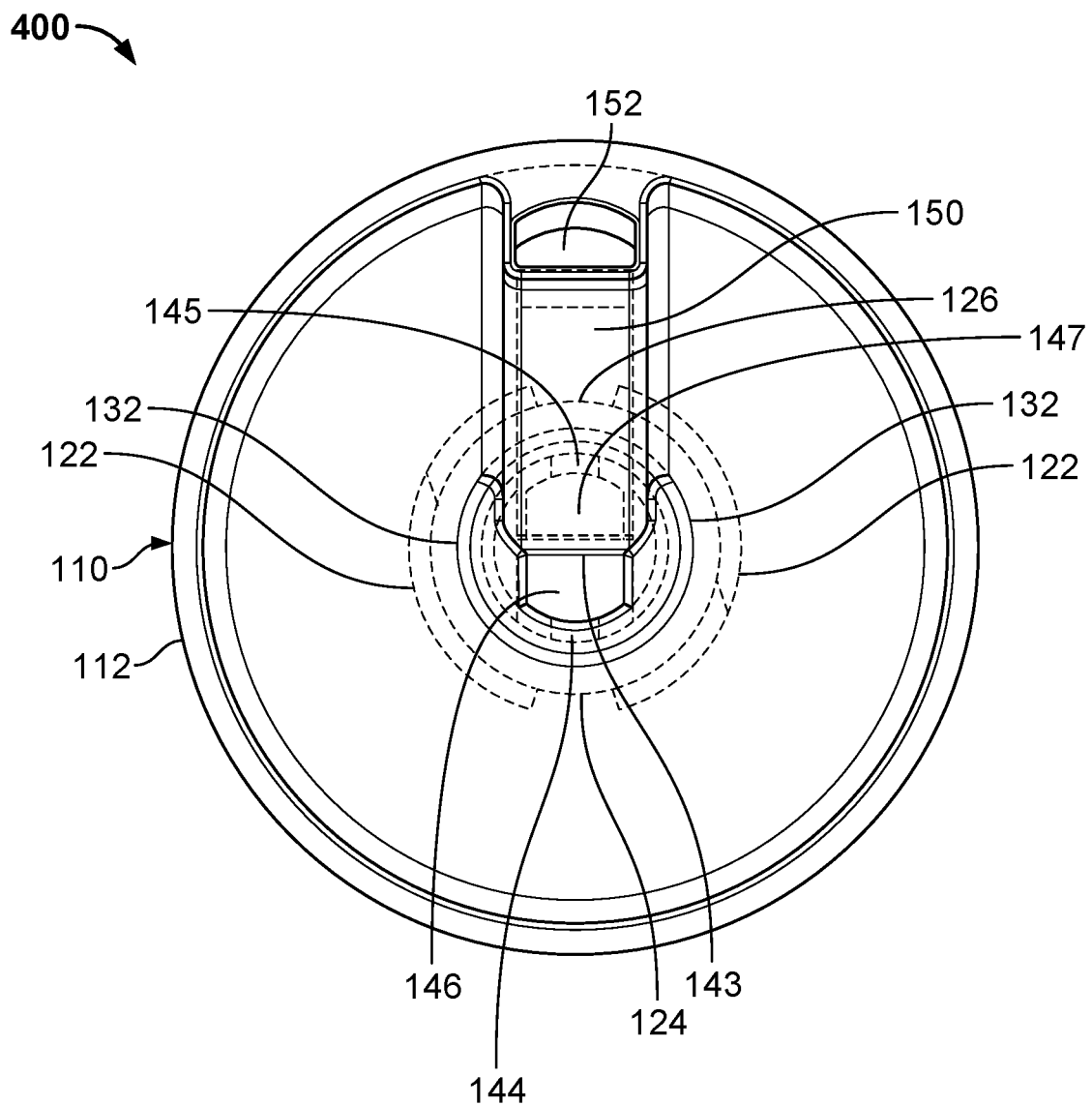
FIG. 4 illustrates a top view of an example filling apparatus, according to an embodiment of the invention.

As shown in FIGS. 1, 2 and 4, the filling apparatus may further include a gas release vent 150 running internally and conformally from a bottom end of the bottom hollow cylinder 140 to the top opening 112 of the upper hollow body 110. The gas release vent 150 may be fixed to an inside wall surface of the second annular cylinder 130, the first annular cylinder 120 and the upper hollow body 110 by means of welding, gluing, soldering, machining, carving, 3D printing, and so forth. Alternatively, the gas release vent 150 may be integral or integrated to other corresponding components of the filling apparatus, which can be formed by molding, 3D printing, casting, machining, and so on. The gas release vent 150 may be adapted to have any suitable shape and length with various cross-section geometries. For example, a top opening or aperture 152 of the gas release vent 150 may be configured to be a circular opening, a triangular opening, a polygonal opening, a square opening or a rectangular opening. The probe divide wall 143 forms a portion of a wall of the gas release vent 150 such that one corresponding hollow space of the two substantially similar hollow spaces forms a portion of the gas release vent. For example, the second opening 147 may serve as a bottom opening of the gas release vent 150, as illustrated in FIG. 4.

In the above example filling apparatus, the locking ring 122, the first keg lock slot 124, the second keg lock slot 126 and the body seal ring 132 are cooperatively adapted to fit a shape of a keg bung provided in a top portion of the keg to create a tight, non-leaking seal to the keg. The keg bung may have a valve structure (i.e., beer valve) and a valve structure for venting or pressurization (i.e., venting or CO2 valve). These valve structures may be ball-valves. The first vent opening probe 141 and the second vent opening probe 142 are configured to open and hold open a valve or a portion of a valve, such as the venting, or CO2 valve, portion of the Sankay-D coupler, provided in the keg bung to trigger release of a gas from inside of the keg. The gas release vent 150 is configured to convey the gas released from the inside of the keg while another corresponding hollow space of the two substantially similar hollow spaces is configured to dispense the liquid into the keg.

As disclosed herein, the venting valve may also be referred to as a CO2 valve. It is located around the ball (beer) valve of the keg bung valve structure. The venting valve is utilized to fill the liquid through when the filling apparatus is attached to the keg. The venting valve may be a ring valve. Once in place, the filling apparatus is designed to open the venting valve by the probe of the filling apparatus, but does not open the ball valve of the beer valve. Once the venting valve is opened, the filling apparatus's design allows it to fill with liquid and release pressure in the keg simultaneously due to the separation created by the vent channel (e.g., the second opening 147) being located opposite the filling channel (e.g., the first opening 146). It should be appreciated that the reference to CO2 or CO2 valve is meant to be non-limiting, as other the venting valve may support other gases, such as nitrogen or air or combinations thereof, as may be used to pressurize kegs or for use in delivery systems using the kegs.

As described above, a gravity filling apparatus is provided having a large diameter circular opening (funnel entrance) aperture 112 with side walls 118 which taper down vertically along the funnel axis 116 to a smaller diameter distal opening (funnel bottom) which affixes to a keg by means of a locking ring 122. The locking ring 122 uses keg lock slots 124 and 126 and a body seal ring 132 to properly affix itself and create a tight non-leaking seal to the keg. Molded to, or affixed by welding, epoxy or any other means to the funnel bottom terminal end are a first vent opening probe 141 and a second vent opening probe 142. Both opening probes 141 and 142 are long enough to open and hold open the valve, or a portion of the valve (e.g., the venting valve), just enough to trigger the release of gas (e.g., $CO_2$) from the keg. The length of the first vent opening probe 141 may be substantially same as the length of the second vent opening probe 142 along the funnel/central axis 116 of the filling apparatus, according to one embodiment.

The length of the opening probes 141 and 142 (which may be referred to together as the "probe") is typically very important to the performance of the filling apparatus descried herein. According to a preferred embodiment, the length of the first vent opening probe 141 and the length of the second vent opening probe 142 are configured to be a length that is capable of opening a portion of the keg bung valve to enable release of only the gas but not the liquid from inside of the keg. The length of the first vent opening probe 141 and the length of the second vent opening probe 142 may vary depending on the dimension and function mechanism of the keg bung. For example, according to one embodiment, the length of the first vent opening probe 141 and the length of the second vent opening probe 142 may be configured to range from about 0.1 inches to about 0.4 inches. Preferably, the length of the first vent opening probe 141 and the length of the second vent opening probe 142 are configured to range from about 0.25 inches to about 0.3 inches. According to one specific embodiment, the length of the first vent opening probe 141 and the length of the second vent opening probe 142 are configured to be about 0.28 inches.

Accordingly, in the act of opening the valve to release the pressure of the keg, the opening probes 141 and 142 are configured to be long enough to only release the gas and no liquid. Shorter opening probes 141 and 142 may slow down dispensing of the liquid into the keg. However, longer opening probes 141 and 142 may cause release of the pressurized liquid in the keg as well. When the opening probes 141 and 142 are longer than necessary, it is possible or even likely that liquid under pressure inside the keg would be forcibly expelled from the keg for some period of time, which is very undesirable due to the mess that would result.

Also as described above, the distal bottom opening of the filling apparatus is bifurcated into two apertures 146 and 147 directly opposed from one another. One aperture (e.g., the first opening 146 with an example dimension of about 0.34 inches by 0.58 inches) may serve as an ingress flow hole for pouring liquid into the keg, and the other aperture (e.g., the second opening 147 with an example dimension of about 0.34 inches by 0.58 inches) may serve as the bottom vent opening of the gas release (egress) vent 150. The ingress flow hole and the bottom vent opening are separated by the probe divide wall 143, which also transitions into and serves as one wall of the gas release (egress) vent 150 as the gas release vent 150 rises to the top of the filling apparatus. In an exemplary embodiment, filling apparatus may be designed such that it can allow approximately one liter of liquid to flow into a keg every 20 seconds through the ingress aperture.

The gas release vent 150 (e.g., having a cross-section dimension of about 0.34 inches×0.58 inches over its length) may be molded or affixed in any manner (e.g., welded, soldered, machined, carved, 3D printed, etc.) to the wall of the funnel, or other location relative to the funnel, and according to a preferred embodiment runs the length of the funnel as shown along the funnel axis 116 from the funnel entrance aperture 112 to the distal funnel bottom. The gas release vent 150 has a top opening 152 (e.g., about 0.34 inches×0.58 inches) and a bottom opening 147 (e.g., about 0.34 inches×0.58 inches) according to one embodiment. The gas release vent 150 is sufficiently large to provide enough ventilation to accommodate enough gas (e.g., air) flow to allow approximately one liter of liquid to flow into the keg every 20 seconds, according to one embodiment.

The filling apparatus with the circular opening aperture 112 can be held in a vertical position above a keg by engaging the locking ring 122, the first keg lock slot 124, the second keg lock slot 126, the body seal ring 132, the first anti-leak side wall 144, the second anti-leak side wall 145, the first vent opening probe 141, and the second vent opening probe 142 to a keg bung of the keg. The locking ring 122, keg lock slots 124 and 126, body seal ring 132, anti-leak side walls 144 and 145, vent opening probes 141 and 142, along with the ingress flow hole 146 and the gas release vent bottom opening 147 may comprise the bottom of the gravity keg filling funnel.

The gravity keg filling funnel as disclosed herein may be sufficiently large (e.g., about 5.5 inches wide by about 4.25 inches high, but the general vertical size and funnel entrance diameters can vary significantly without impacting the functionality of the funnel) and strong enough to be used to allow a user to open at least a portion of the keg bung valve (e.g., the venting valve portion (e.g., CO2 valve)) by manually grasping onto the funnel, and forcefully pressing the funnel vent opening probes 141 and 142 into the keg bung with such necessary force and pressure, while also twisting the funnel clockwise, so as to be able to simultaneously depress and open at least a portion of the keg valve (e.g., the venting valve) and lock the funnel into place to the bung of the keg. The vent opening probes 141 and 142 are long enough (e.g., approximately ¼ inches in one embodiment) to open the keg venting valve in the keg bung and release the keg pressure through the gas release vent 150.

By locking the funnel into place the opening probes 141 and 142 hold the bung valve in the open position. The configuration of the funnel ingress flow hole 146 and the egress opening 147 can allow any keg pressure to be released and the inside of the keg to stabilize to an atmospheric pressure. Locked onto the keg in this manner can provide access and the ability to then pour any liquid of choice into the keg in a quick, clean and efficient manner.

In some embodiments, the filling apparatus disclosed herein may be formed as an integral entity, for example, by a molding process or a 3D printing process. In other embodiments, the filling apparatus disclosed herein may be formed by joining and connecting its various separate components, such as the upper hollow body 110, the first annular cylinder 120, the second annular cylinder 130, and the bottom hollow cylinder 140. The various separate components may be joined and/or connected one another by, for example, welding, gluing, soldering, machining, and/or carving.

Figure 5:
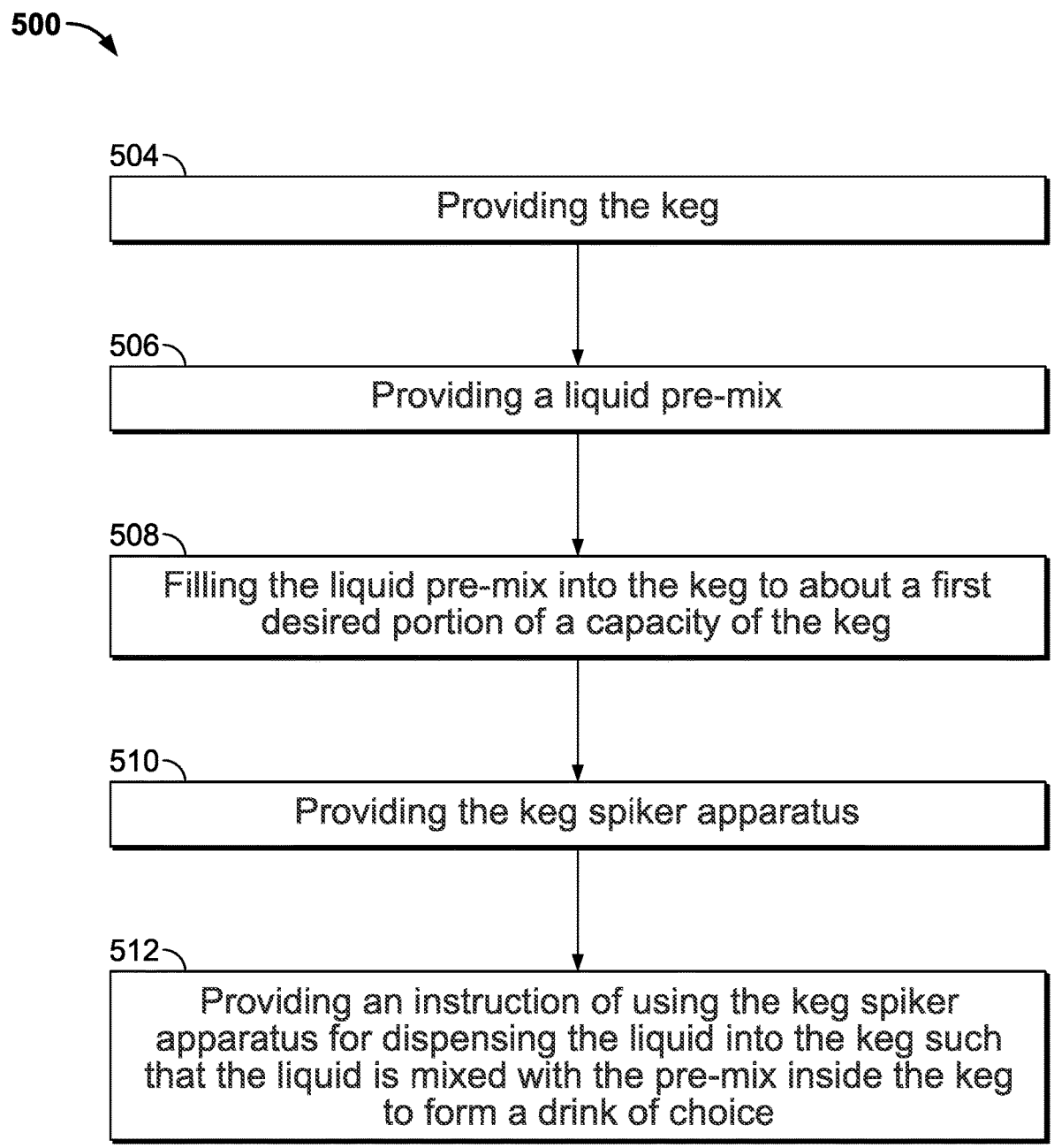
FIG. 5 is a flow chart for an example process of providing a keg partially filled with a non-alcoholic, liquid premix, according to an embodiment of the invention.

As described above, the filling apparatus disclosed herein can be used to dispense one or more liquids into a keg. FIG. 5 illustrates a flow chart for an example process 500 for providing a keg partially filled with a non-alcoholic, liquid premix, according to one embodiment of the invention. The process 500 may be performed, for example, by a user such as a provider or manufacturer of non-alcoholic, liquid pre-mixes for making mixed drinks. The process 500 may include the following steps.

In step 504, a keg is provided. The keg may be any suitable keg, such as a keg with a standard valve that connects to a standard coupler, such as the Sankey A, D, G, M, S, or U type systems. In a preferred embodiment, the keg includes a Sankey-D ball valve which is compatible with the Sankey-D coupler that is widely used in bars, restaurants, and other establishment and venues for serving beer on draft. The keg may include a keg bung in a top portion of the keg. The keg bung may be provided with a ball-valve inside the keg bung for, for example, allowing liquid to flow out of the keg but not into the keg. The keg bung may further include other valves, for example, a venting valve (e.g., gas or CO2 valve) that allows flowing gas into to the keg to pressurize liquid out of the keg when the keg is in regular use. For example, in normal use of the keg, when being dispensed, the venting valve (e.g., CO2 valve) is opened to add pressure to the top of the liquid in the keg, so when the tap is opened at the bar, liquid can flow through the ball valve (also known as a beer valve) out of the keg. The Sankey-D coupler, once attached to the keg, can serve two functions: 1) it opens both the venting valve and the ball or beer valve simultaneously so that pressure can be added to the top of inside of the keg, and 2) the liquid can be released from the keg through the ball valve once the tap is opened on the bar, in a restaurant, and/or at other event venues.

In step 506, a liquid pre-mix is provided. The liquid pre-mix may be any desired non-alcoholic pre-mix, including but not limited to, a liquid premix for margaritas, mojitos, mules, Paloma, Tonic, Lemonade, Cola, Seltzer, and/or Sodas. The liquid pre-mix may also comprise a single product such as Coca Cola for a rum and Coke mixed drink, or tonic water for a gin and tonic drink.

In step 508, the liquid pre-mix is filled into the keg to a first desired portion of a capacity of the keg. The liquid pre-mix may be filled into the keg in any manner using any suitable devices or systems as known in the art. The first desired portion of the capacity may be about two thirds of the capacity of the keg according to one embodiment. For example, if the capacity of the keg is about 30 liters, the first desired portion of the capacity may be about 21 liters. Other mix ratios are possible.

In step 510, the filling apparatus is provided to engage the keg. In various embodiments, the filling apparatus may be provided to an end user. As described above, according to one embodiment, the filling apparatus may comprise an upper hollow body having a top opening and a bottom opening; a first annular cylinder coupled to the upper hollow body via the bottom opening; a locking ring having a first keg lock slot and a second keg lock slot opposite to the first keg lock slot and coupled to an outer circular surface of the first annular cylinder; a second annular cylinder coupled to the first annular cylinder; a body seal ring coupled to an outer circular surface of the second circular cylinder; a bottom hollow cylinder coupled to the second annular cylinder and including a first vent opening probe, a second vent opening probe opposite to the first vent opening probe, a probe divide wall connecting the first vent opening probe with the second vent opening probe, the probe divide wall dividing an internal hollow space of the bottom hollow cylinder into two substantially same hollow spaces; and a gas release vent running internally from a bottom end of the bottom hollow cylinder to the top opening of the upper hollow body, the probe divide wall forming a portion of a wall of the gas release vent such that one corresponding hollow space of the two substantially same hollow spaces forms a portion of the gas release vent.

In step 512, an instruction for using the filling apparatus for dispensing the liquid (e.g., alcohol) into the keg is provided to an end user such that the alcoholic liquid is mixed with the non-alcoholic pre-mix inside the keg to form a mixed drink of choice. The liquid dispensed into the keg using the apparatus can be any suitable liquid for forming the drink of choice by mixing the dispensed liquid with the pre-mix inside the keg. For example, the liquid dispensed into the keg using the apparatus can be alcoholic spirits of various amounts to form various mixed drinks.

Figure 6:
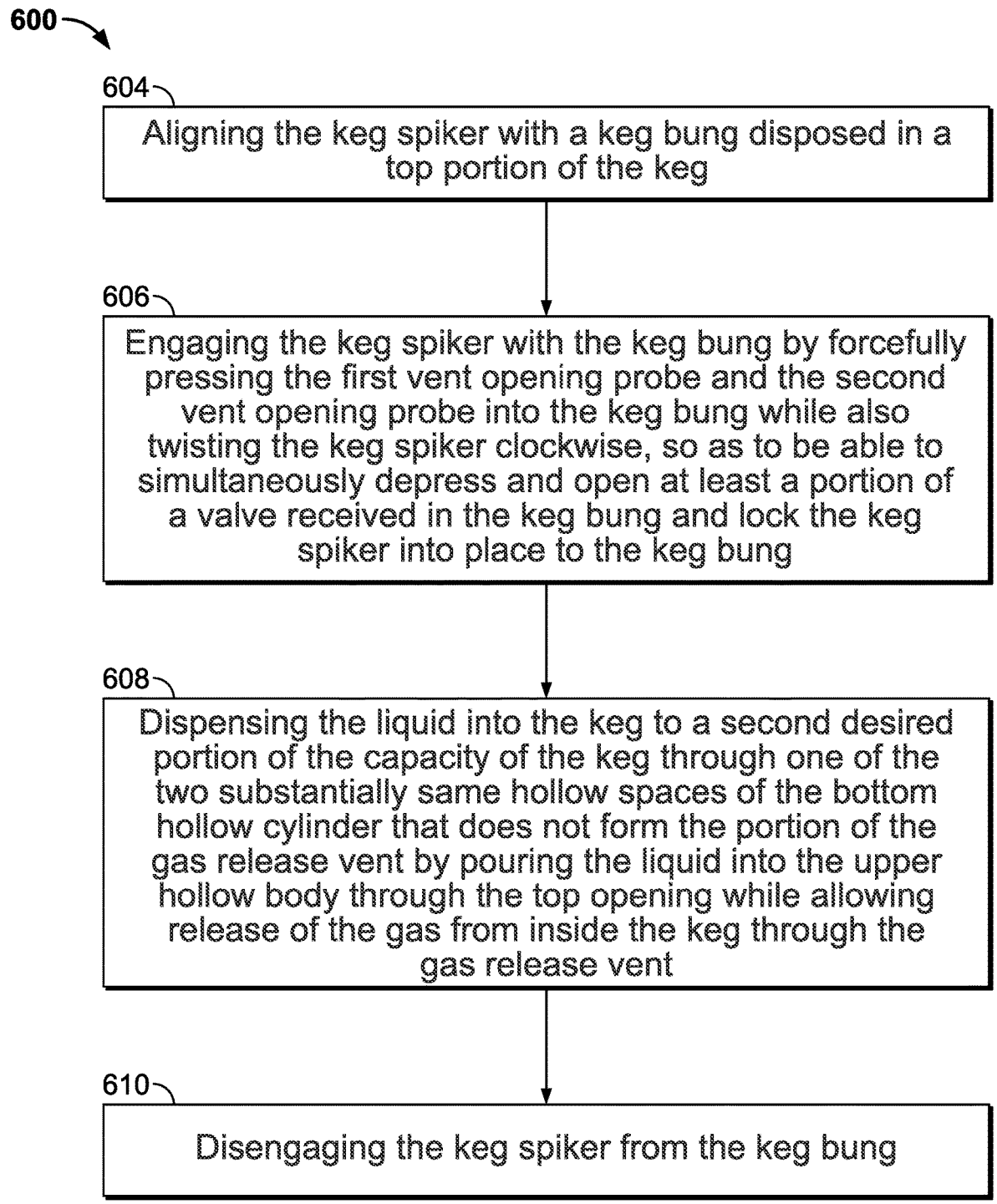
FIG. 6 is a flow chart for an example process of using a filling apparatus for dispensing a liquid into a keg, according to an embodiment of the invention.

FIG. 6 illustrates an example of a method of using the filling apparatus to dispense the liquid into a keg. The method 600 may include the following steps.

In step 604, the filling apparatus is aligned with the keg bung disposed in the top portion of the keg. For example, by grasping and manipulating the filling apparatus, the bottom terminal of the filling apparatus is in a position ready for fitting into the keg bung.

In step 606, the filling apparatus is engaged with the keg bung by forcefully pressing the first vent opening probe and the second vent opening probe into the keg bung while also twisting the filling apparatus clockwise, according to one embodiment, so as to be able to simultaneously depress and open at least a portion of the keg bung valve (e.g., the venting valve) received in the keg bung and lock the filling apparatus into place to the keg bung. Securing the filling apparatus onto the keg bung can be achieved with the locking ring, the first keg lock slot, the second keg lock slot and the body seal ring to create a tight non-leaking seal to the keg.

In step 608, the liquid, e.g., alcoholic spirits, is dispensed into the keg to a second desired portion of the capacity of the keg through one (e.g., the first opening 146) of the two substantially same hollow spaces of the bottom hollow cylinder that does not form the portion of the gas release vent by pouring the liquid into the upper hollow body through the top opening while allowing release of the gas from inside the keg through the gas release vent. The first opening 146 may be engaged with the venting valve of the keg bung to allow the liquid to flow into the keg through the venting valve while the gas is allowed to be released from the second opening 147. The gas released from inside of the keg may be a nitrogen gas, a carbon dioxide gas, an air gas, or combinations thereof.

The second desired portion of the keg capacity can be all or a portion of the remaining keg capacity. For example, if the keg has been filed ⅔ full of the non-alcoholic, liquid cocktail mix, the second portion, used to pour in the alcohol, can be up to the remaining ⅓ of the keg capacity. For example, if the capacity of the keg is about 30 liters and the first desired portion of the capacity is about 21 liters (the non-alcoholic, liquid pre-mix is filled up to about 21 liters), the second desired portion added with the filling apparatus may be up to 9 liters. Different amounts of the liquid dispensed into the keg may form different flavors or varieties of the mixed drink. It should be appreciated that various ratios of liquid pre-mix and additive liquid may be used as desired to achieve the desired drink mix and flavoring.

In step 610, the filling apparatus is disengaged from the keg bung. After dispensing the liquid into the keg up to the second desired portion of the capacity of the keg, the filling apparatus may be disengaged from the keg bung and removed.

In some embodiments, the method 600 may further include allowing a pressure inside the keg to substantially stabilize to an atmospheric pressure outside of the keg before pouring the liquid into the upper hollow body for dispensing the liquid into the keg.

In some embodiments, the method 600 may further include shaking the keg to significantly mix the non-alcoholic liquid pre-mix and the alcohol inside the keg to form the drink of choice.

In some embodiments, the method 600 may include engaging the keg bung with a standard dispensing apparatus to dispense the drink of choice. For example, in a bar, the keg may be set up with a standard Sankey coupler to dispense the mixed drink to customers, e.g., provide a mixed drink on draft through a standard Sankey coupler and tap, which are widely used for serving beer in bars, restaurants and other establishments.

Figure 7:
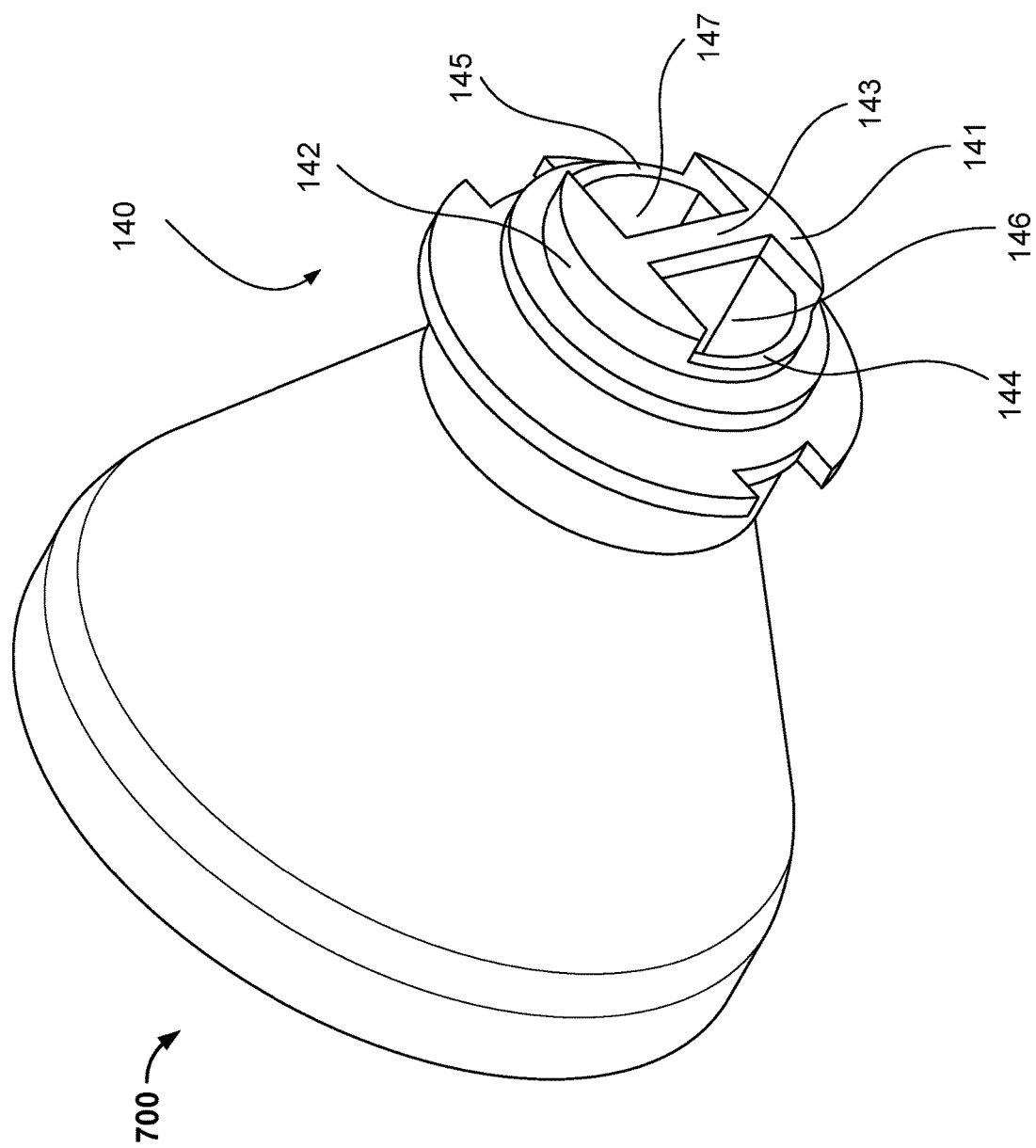
FIG. 7 illustrates a bottom perspective view of an example filling apparatus, according to one embodiment of the invention.

FIG. 7 illustrates a bottom perspective view 700 of an example filling apparatus, according to one embodiment of the invention, such as filling apparatus (or Keg Spiker) 100 described above with respect to FIGS. 1-4. As shown in FIG. 7, the bottom hollow cylinder 140 includes the first vent opening probe 141, the second vent opening probe 142 opposite to the first vent opening probe 141, and the probe divide wall 143 connecting and extending between the first vent opening probe 141 with the second vent opening probe 142. The bottom hollow cylinder 140 further includes the first anti-leak side wall 144 and the second anti-leak side wall 145 opposite the first anti-leak side wall 144. The first anti-leak side wall 144 and the second anti-leak side wall 145 laterally connect with the first vent opening probe 141 and the second vent opening probe 142 correspondingly to form the vertical side wall of the bottom hollow cylinder 140. As described above, the first anti-leak side wall 144 and the second anti-leak side wall 145 are typically shorter than the first vent opening probe 141 and the second vent opening probe 142 along the central axis 116, and may be formed by carving out or machining off corresponding portions of the vertical side wall of the bottom hollow cylinder 140. Further, the probe divide wall 143 is configured to divide an internal hollow space of the bottom hollow cylinder 140 into two hollow spaces: the first opening or aperture 146 and the second opening or aperture 147 opposite the first opening 146. The first opening 146 and the second opening 147 may be substantially similar in size according to one embodiment.

Figure 8:
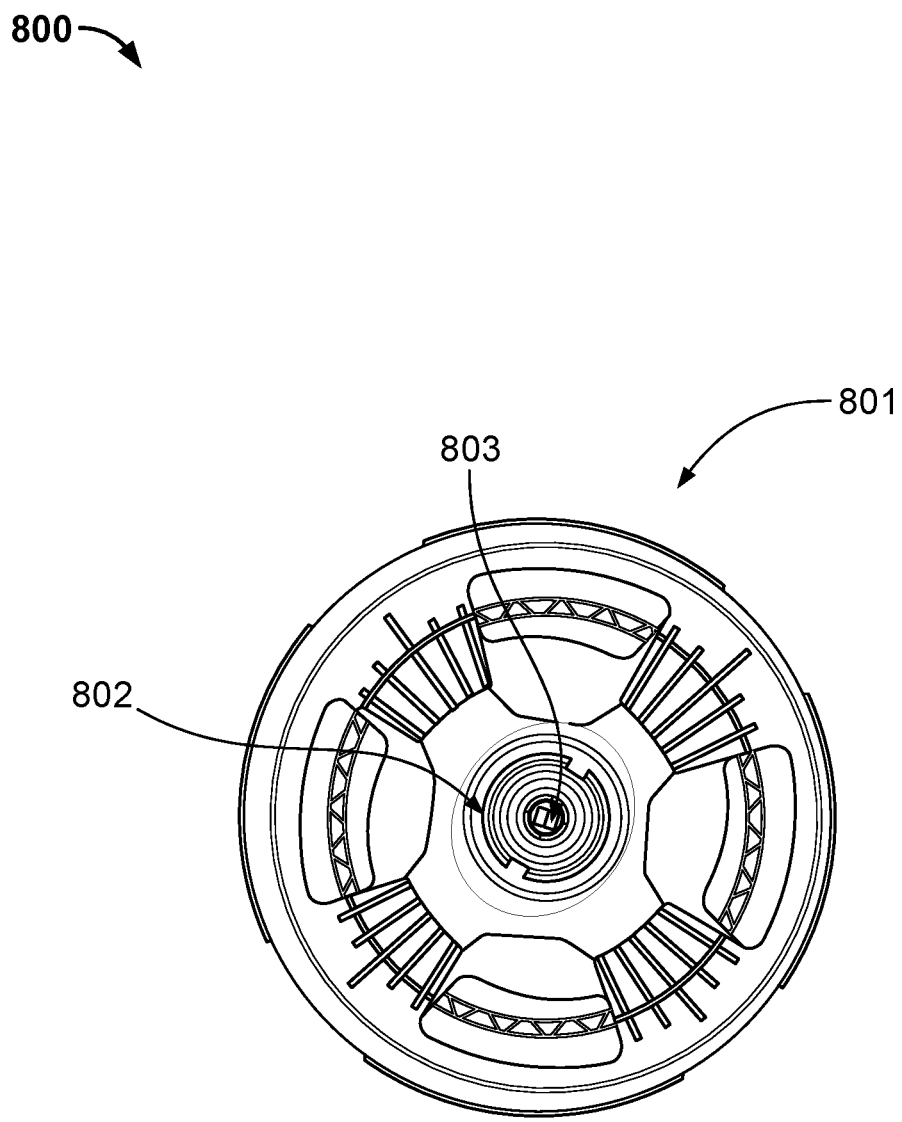
FIG. 8 illustrates a top perspective view of an example keg, according to one embodiment of the invention.

FIG. 8 illustrates a top perspective view 800 of an example keg 801, according to one embodiment of the invention. The keg 801 shown in FIG. 8 may be a conventional steel keg or a one-time use plastic keg. In various embodiments, the key may be of any type and may be made of any material, such as a recyclable material, plastic, metal. The keg may be clear or opaque. As shown in FIG. 8, a keg bung 802 is coupled to the top of the keg 801. The keg bung 802 may be removably coupled to the keg 801 or may be integrated to the keg 801 (e.g., by molding, melding, or soldering). The keg bung 802 may comprise a bung valve 803 (e.g., a ball valve and venting valve). When the filling apparatus disclosed herein is coupled to the keg 801 via the bung 802, the bung valve 803 can be pressed open by the first vent opening probe 141 and the second vent opening probe 142 of the filling apparatus to allow for filling liquid into the keg 801 while venting gas out of the keg 801, as described herein.

Figure 9:
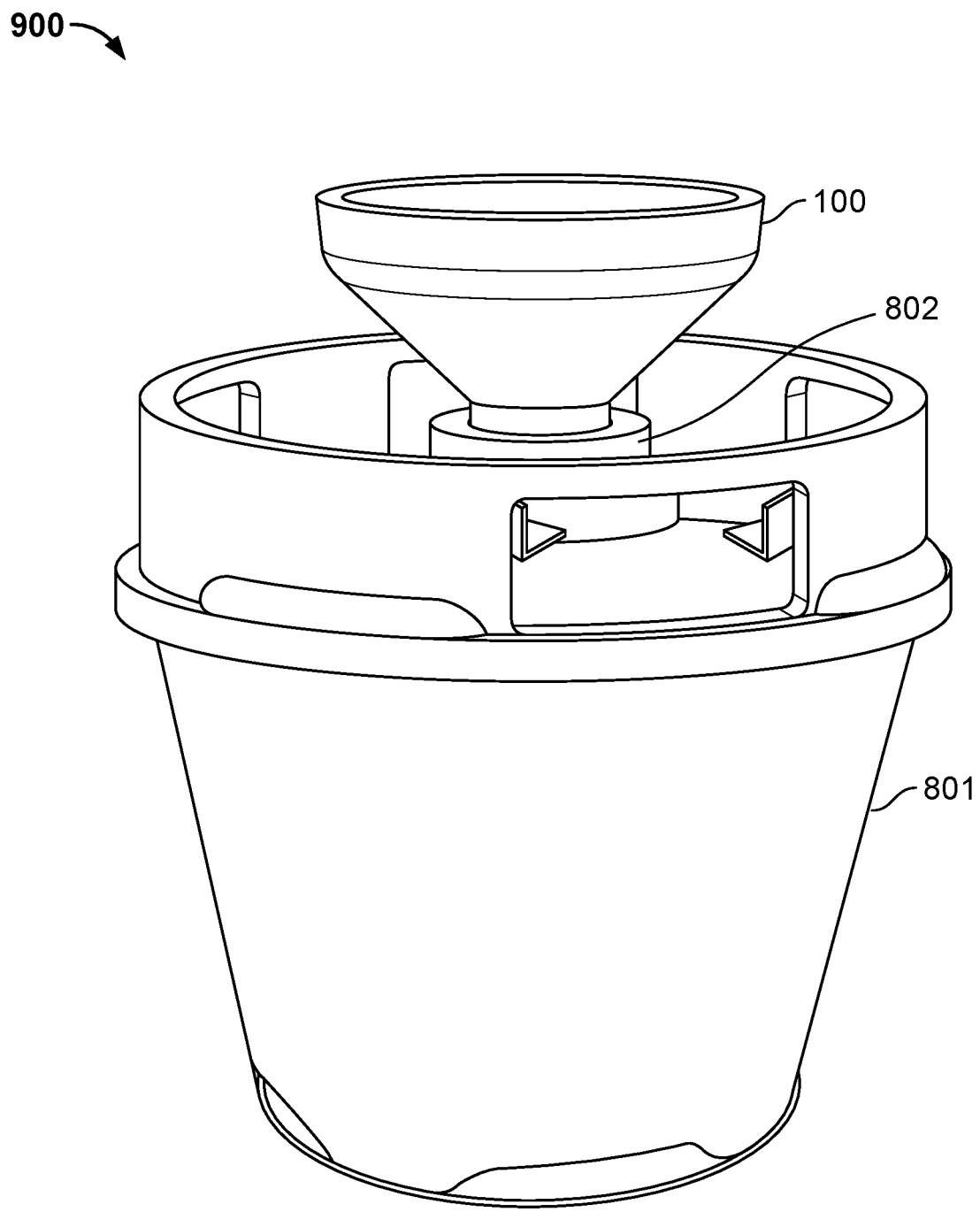
FIG. 9 illustrates a vertical view of a filling apparatus engaged with an example keg, according to one embodiment of the invention.

FIG. 9 illustrates a vertical view 900 of a filling apparatus engaged with an example keg, according to one embodiment of the invention. The vertical view 900 shows a filling apparatus disclosed herein (e.g., the filling apparatus 100) and an example keg (e.g., the keg 801). The filling apparatus can be screwed into the bung of the keg while the filling apparatus is being pressed downward against the bung of the keg. The locking ring of the filling apparatus is locked into the bung of the keg to couple the filling apparatus to the keg. After the filling apparatus disclosed herein is coupled to the keg, a liquid (e.g., alcohol) can be poured into the filling apparatus to allow for filling the liquid into the keg by gravity only and without involving a complex pressurized system conventionally used for filling liquid into a keg, as described above. Gas may be released from the key as described above.

Figure 10:
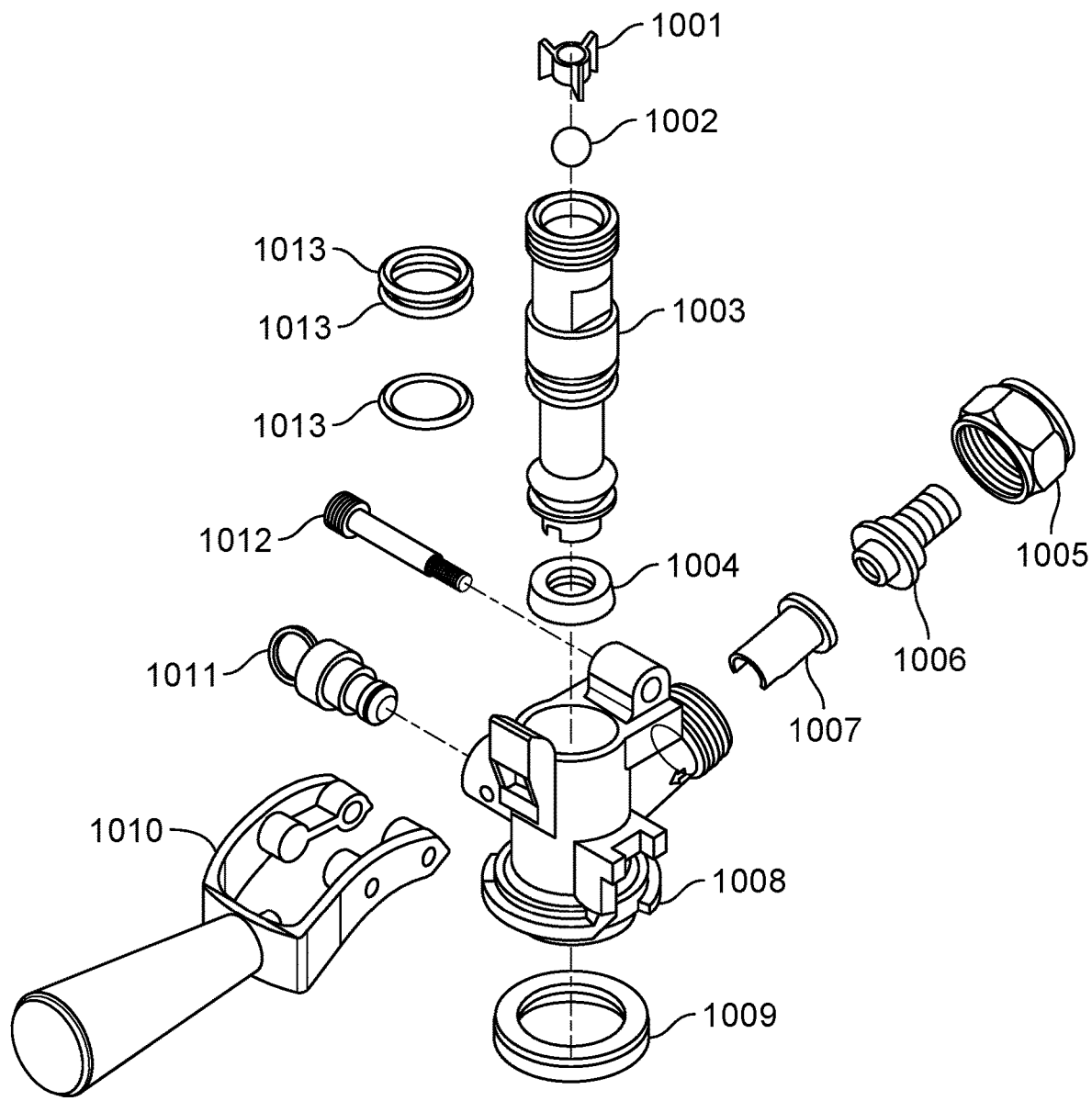
FIG. 10 illustrates an exemplary Sankey D coupler (conventional art) that may be used in embodiments of the invention.

FIG. 10 illustrates an exemplary conventional Sankey D coupler 1000 that may be used in embodiments of the present invention. For example, after filing a keg using the filling apparatus disclosed herein, the conventional Sankey D coupler 1000 may be installed to the keg and is used to dispense the mixed drink as conventionally done in a pressurized tap system. The conventional Sankey D coupler 1000 may comprise a ball retainer 1001, a coupler ball 1002, a probe 1003, a probe seal 1004, a hex nut 1005, a tailpiece 1006 for coupler, a check valve 1007, a coupler body 1008, a bottom seal 1009, a handle assembly 1010, a pressure relief valve 1011, a handle hinge pin 1012, and an O-ring for coupler probe 1003.

Various embodiments of the invention provide a number of advantages. For example, the filling apparatus filling apparatus is easy to use, requiring little training and no other equipment or device. One person is able to use the filling apparatus effectively and easily, e.g., attach it to a keg and fill the keg with spirits using the filling apparatus. It is small enough to be transported easily and stored in a small space. It requires very little expertise to use effectively. The combination of the keg partially filled with a liquid, non-alcoholic pre-mix for a mixed drink, and the filling apparatus which can be easily used by a bartender or restaurant worker to add alcohol to the partially-filled keg in predetermined amounts, together enable a bar or restaurant to efficiently make and serve mixed drinks of consistently high quality on draft using standard, widely deployed coupling and serving equipment, such as the Sankey-D coupler and taps.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

Although some embodiments of the invention are illustrated and described herein as embodied in a hand-held pressure release and gravity filling funnel, it is not intended to be limited to the details shown because various modifications and structural changes may be made therein without departing from the spirit of the invention and within the scope and range of equivalents of the attributes described. Additionally, well-known elements of exemplary embodiments of the invention are not described in detail or omitted so as not to obscure the relevant details of the invention.

Further, it is to be understood that the terminology used herein is for the purpose of describing particular embodiments only and is not intended to be limiting. The terms "a" or "an" as used herein, are defined as one or more than one. The term "plurality" as used herein, is defined as two or more than two. The term "another" as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper," "lower," "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. The term "funnel axis" should be understood to mean in a direction corresponding to the funnel channel.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

What is claimed is:

1. A method of distributing mixed drinks comprising:
providing a keg containing a non-alcoholic mix of liquids, wherein: the mix is designed to be converted to a mixed drink by addition of alcohol; the quantity of mix in the keg is predetermined to allow for the addition of a predetermined quantity of the alcohol into the keg to complete the mixed drink; and the keg comprises a valve that is designed to connect to a coupler used to dispense beverages from the keg; and
providing an apparatus to engage the keg and for pouring the alcohol into the keg, wherein the apparatus includes an upper hollow body connected to a lower hollow body, and the lower hollow body includes a locking ring to lock the apparatus onto the keg and a probe to displace a portion of the valve, allowing gas to escape from the keg and allowing the alcohol to be poured into the keg through the upper hollow body and the lower hollow body.

2. The method of claim 1, wherein the valve comprises a Sankey-D valve and the portion displaced by the probe is a venting valve.

3. The method of claim 1, further comprising providing instructions to the end user regarding the process for installing the apparatus on the keg.

4. The method of claim 3, further comprising providing instructions to an end user regarding the amounts and types of alcohol to be added to the mix in the keg.

5. The method of claim 1, wherein the keg comprises one of a recyclable material, plastic, an opaque material, or a clear material.

6. The method of claim 1, wherein: the quantity of mix is about two thirds of a capacity of the keg, and the quantity of the alcohol is about one third of the capacity of the keg.

7. The method of claim 1, wherein: a capacity of the keg is about 30 liters; and the quantity of the mix is about 21 liters.

8. The method of claim 1, wherein the mix includes a liquid premix for a margarita.

9. A method of preparing mixed drinks comprising: receiving a keg containing a non-alcoholic mix of liquids, wherein (a) the mix is designed to be converted to a mixed drink by addition of alcohol; (b) the quantity of the mix in the keg is predetermined to allow for the addition of a predetermined quantity of the alcohol into the keg to complete the mixed drink; and (c) the keg comprises a valve designed to be connected to a coupler through which the mixed drink is dispensed; and using an apparatus to pour the alcohol into the keg, wherein the apparatus includes an upper hollow body connected to a lower hollow body, and the lower hollow body includes a locking ring to lock the apparatus onto the keg and a probe to displace a portion of the valve in the keg, allowing gas to escape from the keg and allowing the alcohol to be poured into the keg through the upper hollow body and the lower hollow body.

10. The method of claim 9, wherein the keg comprises a Sankey-D valve and the portion of the valve displaced by the probe comprises a venting valve.

11. The method of claim 10, further comprising: mixing the mix with the alcohol to complete the mixed drink in the keg; connecting the keg to a Sankey-D coupler; and dispensing the mixed drink through a tap connected to the Sankey-D coupler.

12. The method of claim 10, wherein the apparatus includes an opening that is designed to enable a flow rate of one liter of the alcohol into the keg in about twenty seconds.

13. A system for distributing mixed drinks comprising:
a keg containing a non-alcoholic mix of liquids, wherein (a) the mix is designed to be converted to a mixed drink by addition of alcohol; (b) the quantity of the mix in the keg is predetermined to allow for the addition of a predetermined quantity of the alcohol into the keg to complete the mixed drink; and (c) the keg comprises a valve designed to be connected to a coupler through which the mixed drink is dispensed; and
an apparatus for pouring the alcohol into the keg, wherein the apparatus includes an upper hollow body connected to a lower hollow body, and the lower hollow body includes a locking ring to lock the apparatus onto the keg and a probe to displace a portion of the valve in the keg, allowing gas to escape from the keg and allowing the alcohol to be poured into the keg through the upper hollow body and the lower hollow body.

14. The system of claim 13, wherein the keg comprises a Sankey-D valve and the portion of the valve displaced by the probe comprises a venting valve.

* * * * *